(12) United States Patent
Hasemann

(10) Patent No.: US 8,328,925 B2
(45) Date of Patent: Dec. 11, 2012

(54) STABLE LIQUID FORMULATION

(75) Inventor: Ludwig Hasemann, Muellheim-Niederweiler (DE)

(73) Assignee: Clariant Finance (BVI) Limited, Tortola (VG)

( * ) Notice: Subject to any disclaimer, the term of this patent is extended or adjusted under 35 U.S.C. 154(b) by 352 days.

(21) Appl. No.: 12/601,096

(22) PCT Filed: May 21, 2008

(86) PCT No.: PCT/EP2008/056220
§ 371 (c)(1),
(2), (4) Date: Nov. 20, 2009

(87) PCT Pub. No.: WO2008/142089
PCT Pub. Date: Nov. 27, 2008

(65) Prior Publication Data
US 2010/0167028 A1 Jul. 1, 2010

(30) Foreign Application Priority Data

May 23, 2007 (EP) .................................... 07108745

(51) Int. Cl.
*C09D 11/02* (2006.01)
*C09B 29/00* (2006.01)
(52) U.S. Cl. .................. 106/31.5; 106/31.43; 106/31.58; 8/682
(58) Field of Classification Search .................. 106/31.5, 106/31.58, 31.43; 427/256, 288; 428/195.1, 428/211.1; 8/571, 682
See application file for complete search history.

(56) References Cited

U.S. PATENT DOCUMENTS

| | | | | |
|---|---|---|---|---|
| 1,833,269 A | * | 11/1931 | Stusser | 534/741 |
| 3,274,171 A | * | 9/1966 | Anderson et al. | 534/741 |
| 4,001,206 A | * | 1/1977 | Schoefberger | 8/682 |
| 4,254,026 A | * | 3/1981 | Bauer et al. | 534/887 |
| 4,399,068 A | * | 8/1983 | Kramer | 534/728 |
| 4,881,977 A | * | 11/1989 | Bauer et al. | 106/31.5 |
| 5,302,704 A | * | 4/1994 | Adam et al. | 534/738 |
| 5,391,207 A | | 2/1995 | Gerlach et al. | |
| 7,300,474 B2 | | 11/2007 | Zirkenbach et al. | |
| 7,553,359 B2 | | 6/2009 | Berenguer et al. | |
| 2006/0174800 A1 | | 8/2006 | Lin et al. | |

FOREIGN PATENT DOCUMENTS

| | | |
|---|---|---|
| EP | 0524520 | 1/1993 |
| EP | 0565286 | 10/1993 |
| EP | 1350820 | 10/2003 |
| WO | WO 03/055959 | 7/2003 |

OTHER PUBLICATIONS

PCT International Search Report for PCT/EP 2008/056220, mailed Oct. 21, 2008.
PCT Written Opinion of the International Searching Authority for PCT/EP 2008/056220, mailed Oct. 21, 2008.
English Abstract for JP 2002 212475, Jul. 31, 2002.
English Abstract for WO 03/055959, Jul. 10, 2003.

* cited by examiner

Primary Examiner — Helene Klemanski
(74) Attorney, Agent, or Firm — Anthony A. Bisulca

(57) ABSTRACT

The present invention concerns concentrated aqueous solutions of an anionic disazo dye, comprising salts and or the free acids of the anionic dye of the formula (I)

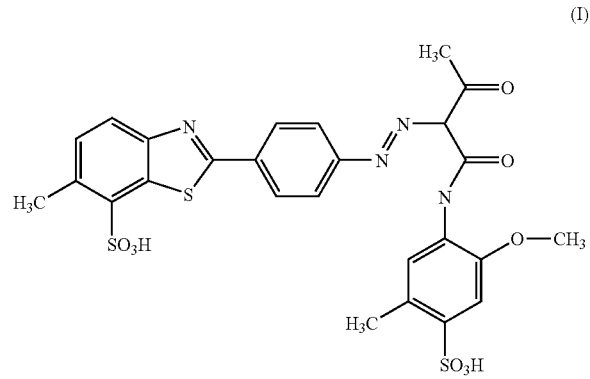

(I)

and 2-(2-butoxyethoxy)ethanol and the use of these solutions for dyeing and/or printing hydroxyl-containing substrates and for producing inkjet inks.

7 Claims, No Drawings

STABLE LIQUID FORMULATION

The present invention concerns concentrated storage-stable aqueous dye solutions, especially concentrated storage-stable aqueous dye solutions comprising an anionic disazo dye. The invention further concerns the use of the present invention's concentrated dye solutions, if appropriate after dilution with water, especially for dyeing and printing paper, including card and board. The invention likewise concerns the production of printing inks, especially inkjet printing inks, by using the concentrated dye solutions of the present invention.

Industrial dyeing and printing is customarily carried out in an aqueous medium. So pulverulent dyes first have to be dissolved, usually in warm or hot water, to be able to use them for printing and dyeing.

Metering systems have been developed in recent years to control the addition of dye by weighing or volumetrically, and they often require stable dye solutions instead of powders and granules.

Such dye solutions also have the advantage that they do not dust and do not require costly dissolving operations.

Such solutions should possess a certain stability, so that they do not precipitate during transportation or storage. Typically, they should be stable for a prolonged period between zero and five degrees Celsius, but also at around 50° C. Similarly, frozen solutions shall be stable after thawing and should not present any stability problems during pumping. Solutions containing precipitates can cause disruptions in pumping or metering systems and lead to unacceptable machine shutdowns and costly cleaning and maintenance.

The present invention accordingly provides concentrated aqueous solutions of an anionic disazo dye, comprising salts and or the free acid of the anionic dye of the formula

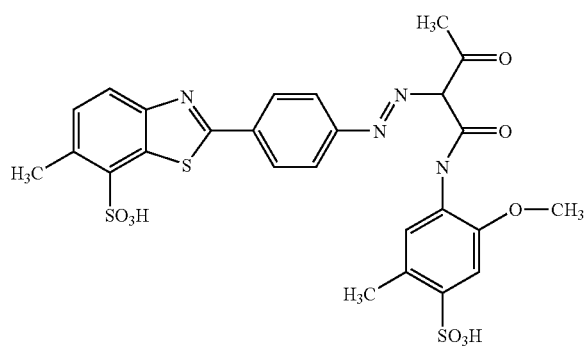

(I)

and 2-(2-butoxyethoxy)ethanol.

The dye of the formula (I) is known (C.I. Direct Yellow 157; C.I. Constitution Number C.I. 13965; CAS Registry Number 72705-26-1).

The solutions according to the present invention comprise 5 to 40 percent by weight (% by weight) of the dye of formula (I), in particular 5% to 20% by weight, most preferably 10% to 12% by weight of the dye of the formula (I).

The solutions according to the present invention may comprise further components such as for example water-soluble organic solubilizers and/or biocides.

Suitable water-soluble organic solubilizers are for example urea, formamide, dimethylformamide, water-miscible polyhydric alcohols such as ethylene glycol, propylene glycol, glycerol, alkanolamines such as ethanolamine, triethanolamine. The preferred water-soluble organic solubilizer is urea.

Therefore the present invention relates in a further aspect concentrated aqueous solutions of an anionic disazo dye, comprising salts and or the free acid of the anionic dye of the formula

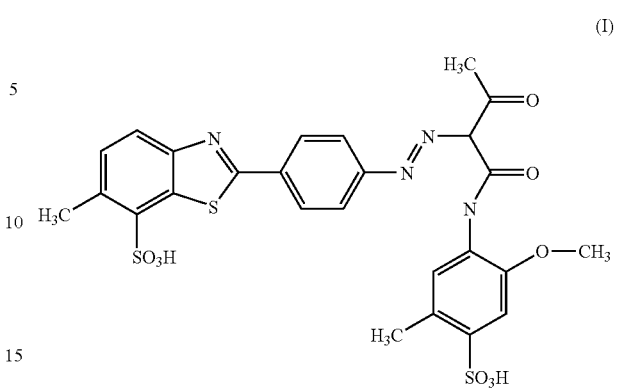

(I)

and 2-(2-butoxyethoxy)ethanol and a water-soluble organic solubilizers.

The suitable water-soluble organic solubilizers, if they are added, are added in an amount of 1% to 6% by weight, preferably 1% to 4% by weight, more preferably in an amount of 2% to 4% by weight and most preferably in an amount of 2% to 3% by weight of the suitable water-soluble organic solubilizer.

If the preferred suitable water-soluble organic solubilizers which is urea, is added, the urea is added in an amount of 1% to 6% by weight, preferably 1% to 4% by weight, more preferably in an amount of 2% to 4% by weight and most preferably in an amount of 2% to 3% by weight of the urea.

Any biocide is suitable. But preference is given to using biocides having FDA and/or BGVV approval. Any biocide capable of controlling the growth of Gram-positive or Gram-negative bacteria, yeasts or fungi can be used in the solutions of the present invention. Suitable biocides are for example thiazol-3-one derivatives, for example alkyl and/or chlorinated thiazol-3-one derivatives or mixtures thereof. Typically, the biocides are used in an amount of 15 parts by weight per million parts of the composition (ppm) up to 1000 ppm; particular preference is given to 50 ppm to 500 ppm (parts by weight per ready-produced composition).

The concentrated solutions of the present invention are generally produced by stirring the free dye acid of the formula (I) with a mixture of water and 2-(2-butoxyethoxy)ethanol until a homogeneous solution forms.

To prepare the dye solution according to the present invention, the dye of the formula (I) is preferably dissolved in demineralized water to give a solution, and is diafiltered by membrane filtration at temperatures of 20-50° C., preferably between 30 and 45° C. and pressures of 10-40 bar, more preferably 20-30 bar and then concentrated to a weight. The concentrated dye solution is admixed with 2-(2-butoxyethoxy)ethanol and optionally with a water-soluble organic solubilizer and if desired with biocide, and diluted to the desired concentration with demineralized water and stirred until homogeneous. The solution obtained is stable in storage in that it neither thickens nor separates under the following conditions: 14 days at 0-5° C., 25° C. and 50° C.

The stable solutions of the present invention comprise preferably not less than 1% by weight and not more than 8% by weight of (2-(2-butoxyethoxy)ethanol. The stable solutions of the present invention comprise not less than 2% by weight and not more than 5% by weight of (2-(2-butoxyethoxy) ethanol; in particular the dye solutions according to the present invention comprise 3 to 5% by weight of (2-(2-butoxy-ethoxy)ethanol.

The solutions preferably generally comprise:
10-12% by weight of the anionic dye (reckoned as free acid),
1-8% by weight of 2-(2-butoxyethoxy)ethanol, and
8-89% by weight of water.

When the solutions of the present invention additionally comprise solubilizer, the composition of the solutions according to the present invention will preferably generally be
10-12% by weight of the anionic dye (reckoned as free acid),
1-8% by weight of (2-(2-butoxyethoxy)ethanol,
1-6% by weight of a water-soluble organic solubilizer, and
74-88% by weight of water.

The solutions of the present invention preferably comprise
10-12% by weight of the anionic dye (reckoned as free acid),
2-5% by weight of 2-(2-butoxyethoxy)ethanol,
1-4% by weight of a water-soluble organic solubilizer, and
79-87% by weight of water.

More preferred solutions of the present invention comprise
10-12% by weight of the anionic dye (reckoned as free acid),
2-5% by weight of (2-(2-butoxyethoxy)ethanol,
2-3% by weight of a water-soluble organic solubilizer, and
80-86% by weight of water.

When the solutions of the present invention additionally comprise the preferred solubilizer, the composition of the solutions according to the present invention will preferably generally be
10-12% by weight of the anionic dye (reckoned as free acid),
1-8% by weight of (2-(2-butoxyethoxy)ethanol,
1-6% by weight of urea, and
74-88% by weight of water.

The solutions of the present invention preferably comprise
10-12% by weight of the anionic dye (reckoned as free acid),
2-5% by weight of 2-(2-butoxyethoxy)ethanol,
1-4% by weight of urea, and
79-87% by weight of water.

More preferred solutions of the present invention comprise
10-12% by weight of the anionic dye (reckoned as free acid),
2-5% by weight of (2-(2-butoxyethoxy)ethanol,
2-3% by weight of urea, and
80-86% by weight of water.

The concentrated solutions of the present invention are notable especially for excellent stability in storage and for a low viscosity at room temperature and temperatures below room temperature, for example at 0-5° C. More particularly, the concentrated solutions of the present invention are stable even when they are kept frozen at −20° C. for 2 days and after thawing they remain stable at 0-5° C. or else at 25° C. and at 50° C. for 14 days without any signs of precipitation. The viscosity of the concentrated solutions according to the present invention increases only insignificantly, if at all, when cooling down to just short of freezing, so that they are readily meterable at low temperatures as well as at normal temperatures.

The concentrated dye solutions of the present invention are used, if appropriate after dilution with water, for dyeing and/or printing hydroxyl-containing substrates. More particularly, the solutions of the present invention are used for dyeing paper, including card and board, these materials being dyeable in the pulp, by coating or by dipping for example. Besides, such a liquid formulation can also be used for a continuous or batch dyeing process for textile materials, especially cellulose.

The invention also comprises hydroxyl-containing substrates which have been dyed and/or printed with the present invention's concentrated dye solutions, if appropriate after (further) dilution with water. More particularly, the invention also comprises paper, including card and board, dyed and/or printed with the concentrated dye solutions of the present invention. Besides, such a liquid formulation can also be used for a continuous or batch dyeing process for textile materials, especially cellulose.

In addition, the concentrated dye solutions of the present invention are useful as colorants in aqueous and non-aqueous inkjet inks and also in hotmelt inks.

Inkjet inks comprise in general a total of 0.5 to 15% by weight, and preferably 1.5% to 8% by weight (reckoned dry, i.e. reckoned back to the pure dye content) of one or more of the concentrated dye solutions of the present invention.

Microemulsion inks are based on organic solvents and water with or without an additional hydrotropic substance (interface mediator). Microemulsion inks comprise in general from 0.5% to 15% by weight, preferably from 1.5% to 8% by weight of one or more of the concentrated dye solutions of the present invention, 5% to 99% by weight of water and 0.5% to 94.5% by weight of organic solvent and/or hydrotropic compound.

Solvent-borne inkjet inks comprise preferably 0.5% to 15% by weight of one or more of the concentrated dye solutions of the present invention, 85% to 99.5% by weight of organic solvent and/or hydrotropic compounds.

Hotmelt inks are usually based on waxes, fatty acids, fatty alcohols or sulphonamides which are solid at room temperature and liquefy on heating, the preferred melting range being between about 60° C. and about 140° C. Hotmelt inkjet inks consist for example essentially of 20% to 90% by weight of wax and 1% to 10% by weight of one or more of the concentrated dye solutions of the present invention. They may further include 0% to 20% by weight of an additional polymer (as a dye dissolver), 0% to 5% by weight of dispersing assistant, 0% to 20% by weight of viscosity modifier, 0% to 20% by weight of plasticizer, 0% to 10% by weight of tackifier, 0% to 10% by weight of transparency stabilizer (prevents crystallization of waxes for example) and also 0% to 2% by weight of antioxidant. The concentrated dye solutions of the present invention are further useful as colorants for colour filters, not only for additive but also for subtractive colour production and also as colorants for electronic inks ("e-inks") or electronic paper ("e-paper").

The examples which follow illustrate the invention. All % data in the description and in the examples are to be understood as % by weight (=% w/w), unless otherwise stated. For the storage-stability test, the prepared solutions were divided into three portions of equal size, and each of the three portions was subjected to one of the three different tests: Test 1: 14 days at 0-5° C., Test 2: 14 days at 25° C. and Test 3: 14 days at 50° C.

EXAMPLE 1

660 g of the dye of the formula (I)

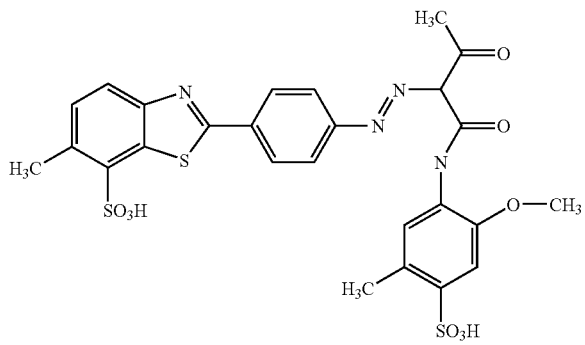

are dissolved in 4200 ml of demineralized water to give a solution of 4500 ml (4860 g), and diafiltered by membrane filtration at temperatures of 40° C., and a pressure of 20 bar, and then concentrated to a weight of 4125 g (3750 ml).

423 g of concentrated dye solution are then admixed with 20 g of 2-(2-butoxyethoxy)ethanol (4% w/w) and 10 g of urea (2% w/w) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is stable in storage in that it neither thickens nor separates under the following conditions: 14 days at 0-5° C., 25° C. and 50° C.

EXAMPLE 2

423 g of concentrated dye solution are then admixed with 20 g of 2-(2-butoxyethoxy)ethanol (4% w/w) and 15 g of urea (3% w/w) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is stable in storage in that it neither thickens nor separates under the following conditions: 14 days at 0-5° C., 25° C. and 50° C.

EXAMPLE 3

423 g of concentrated dye solution are then admixed with 20 g of 2-(2-butoxyethoxy)-ethanol (4% w/w) and 20 g of urea (4% w/w) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is stable in storage in that it neither thickens nor separates under the following conditions: 14 days at 0-5° C., 25° C. and 50° C.

COMPARATIVE EXAMPLE 1

423 g of concentrated dye solution are then admixed with 15 g of 2-(2-butoxyethoxy)-ethanol (3% w/w) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is not stable in storage in that it separates after a few days under the 0-5° C. test.

COMPARATIVE EXAMPLE 2

423 g of concentrated dye solution are then admixed with 25 g of 2-(2-butoxyethoxy)-ethanol (5% w/w) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is not stable in storage in that it separates after a few days under the 0-5° C. test.

COMPARATIVE EXAMPLE 3

423 g of concentrated dye solution are then admixed with 50 g of 2-(2-butoxyethoxy)-ethanol (10% w/w) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is not stable in storage in that it separates after a few days under the 0-5° C. test.

COMPARATIVE EXAMPLE 4

423 g of concentrated dye solution are then admixed with 25 g of urea (5% w/w) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is not stable in storage in that it separates after one week under the 0-5° C. test.

COMPARATIVE EXAMPLE 5

423 g of concentrated dye solution are then admixed with 20 g of 2-(2-butoxyethoxy)-ethanol (4% w/w) and 10 g of Jeffamin T 403 (2% w/w) (Jeffamin T 403 is a trade mark of Huntsman Corp. (CAS No.: 9423-51-3)) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is not stable in storage in that it separates after about one week under all the tests.

COMPARATIVE EXAMPLE 6

423 g of concentrated dye solution are then admixed with 15 g of 2-(2-butoxyethoxy)-ethanol (3% w/w) and 15 g of Jeffamin T 403 (3% w/w) (Jeffamin T 403 is a trade mark of Huntsman Corp. (CAS No.: 9423-51-3)) and 0.75 g of biocide (0.15%) (Proxel GXL TM; Proxel is a trade mark of Zeneca AG Products, Inc. and comprises 1,2-benzisothiazolin-3-one (CAS No.: 2634-33-5)) and diluted to 500 g with demineralized water and stirred until homogeneous.

The solution obtained is not stable in storage in that it separates after about one week under all the tests.

The tests with Example 1 and Comparative Examples 1 to 6 were repeated without biocide. No differences were found.

Dyeing Prescription A 70 parts of chemically bleached pinewood sulphite cellulose and 30 parts of chemically bleached birchwood sulphite cellulose are beaten into 2000 parts of water in a hollander. 1.5 parts of the liquid dye preparation of Example 1 are added to the stuff. Paper is made therefrom after a mixing time of 20 minutes. The absorbent paper obtained in this way has a yellowish colour.

Dyeing Prescription B 1.5 parts of the liquid dye preparation of Example 1 are added to 100 parts of chemically bleached sulphite cellulose beaten with 2000 parts of water in a hollander. After mixing through for 15 minutes, customary sizing is effected using resin size and aluminium sulphate. Paper made from this material exhibits a yellowish hue in each case.

Dyeing Prescription C

An absorbent web of unsized paper is pulled at 40-50° C. through an aqueous dye solution consisting of 95 parts of water and 5 parts of the inventive dye solution of Example 1. Excess dye solution is squeezed by two rolls. The dried web of paper has a yellowish colour in each case.

Dyeing Prescription D 5 parts of the dye preparation of Example 1 are metered into 4000 parts of softened water at room temperature. 100 parts of prewetted woven cotton fabric are introduced into the bath, followed by heating to the boil over 30 minutes. The bath is held at the boil for an hour during which evaporated water is made good from time to time. The dyeing is then removed from the liquor, rinsed with water and dried. The dyeing obtained has a yellowish colour.

Dyeing Prescription E 100 parts of freshly tanned and neutralized chrome grain leather are drummed for 30 minutes in a float of 250 parts of water at 55° C. and 0.5 part of the dye preparation made according to Example 1 and are treated for a further 30 minutes in the same bath with 2 parts of an anionic fatliquor based on sulphonated fish oil. The leathers are conventionally dried and finished. The leather obtained has a level yellowish hue.

Further low-affinity, vegetable-retanned leathers can likewise be dyed according to known methods.

The invention claimed is:

1. A concentrated aqueous solution comprising salts or the free acid of the anionic dye of the formula (I) or both,

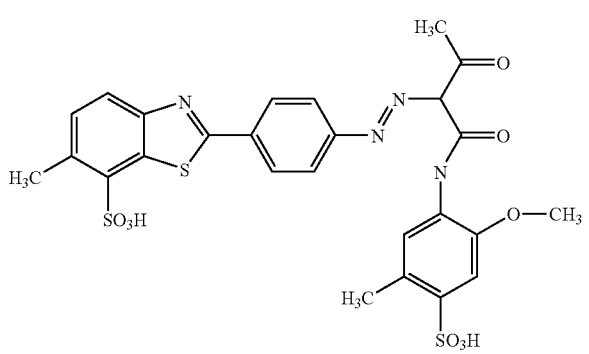

2-(2-butoxyethoxy)ethanol and a water-soluble organic solubilizer, wherein the water-soluble organic solubilizer is urea present in an amount of 1-6% by weight.

2. The concentrated aqueous solution according to claim 1, wherein the concentrated aqueous solution comprises 5% to 40% by weight of the dye of the formula I.

3. The concentrated aqueous solution according to claim 1, comprising 10-12% by weight of the anionic dye of the formula (I), wherein the anionic dye is in the form of a free acid, 1-8% by weight of 2-(2-butoxyethoxy)ethanol, 1-6% by weight of a water-soluble organic solubilizer and 74-88% by weight of water.

4. An ink jet ink comprising a concentrated aqueous solution according to claim 1.

5. A method of utilizing a concentrated aqueous solution according to claim 1 for dyeing and/or printing hydroxyl-containing substrates and for producing inkjet inks comprising the step of adding the concentrated aqueous solution to the dyed and/or printed hydroxyl-containing substrate or the inkjet ink during production thereof.

6. A hydroxyl-containing substrate dyed or printed with a concentrated aqueous solution according to claim 1.

7. The hydroxyl-containing substrate according to claim 6 wherein the hydroxyl-containing substrate is paper.

* * * * *